(12) United States Patent
Lin et al.

(10) Patent No.: US 8,318,844 B2
(45) Date of Patent: Nov. 27, 2012

(54) OIL-DISPERSIBLE COMPOSITE OF METALLIC NANOPARTICLE AND METHOD FOR SYNTHESIZING SAME

(75) Inventors: Jiang-Jen Lin, Taipei (TW); Wei-Cheng Tsai, Taipei (TW); Rui-Xuan Dong, Taipei (TW); Hui-Fen Lin, Taipei (TW); Yueh-Hsien Wu, Taipei (TW)

(73) Assignee: National Taiwan University, Taipei (TW)

( * ) Notice: Subject to any disclaimer, the term of this patent is extended or adjusted under 35 U.S.C. 154(b) by 0 days.

(21) Appl. No.: 13/109,919

(22) Filed: May 17, 2011

(65) Prior Publication Data

US 2012/0123037 A1    May 17, 2012

(30) Foreign Application Priority Data

Nov. 12, 2010   (TW) ................................ 99139065 A (51) Int. Cl.
*C08K 3/08* (2006.01)
(52) U.S. Cl. ........................................................ 524/439
(58) Field of Classification Search .................... 524/439
See application file for complete search history.

(56) References Cited

U.S. PATENT DOCUMENTS

| | | | |
|---|---|---|---|
| 2010/0068143 A1* | 3/2010 | Van Zutphen et al. | 424/9.1 |
| 2010/0120960 A1* | 5/2010 | Lee et al. | 524/403 |
| 2010/0140564 A1* | 6/2010 | Overbreek et al. | 252/514 |
| 2012/0037041 A1* | 2/2012 | Nolte et al. | 106/287.18 |
| 2012/0065309 A1* | 3/2012 | Agrawal et al. | 524/155 |

FOREIGN PATENT DOCUMENTS

DE    102009015470    *   6/2010

* cited by examiner

*Primary Examiner* — Peter Szekely
(74) *Attorney, Agent, or Firm* — Pai Patent & Trademark Law Firm; Chao-Chang David Pai (57) ABSTRACT

The present invention provides an oil-dispersible composite of metallic nanoparticles and a method for synthesizing the same. The composite primarily includes metallic nanoparticles and an oily polymeric polymer such as polyurethane (PU). The oily polymeric polymer serves as a carrier of the metallic nanoparticles by chelating therewith so that the metallic nanoparticles are dispersed uniformly. In the method of the present invention, the metallic ions are first chelated by the oily polymeric polymer and then reduced into nanoparticles. The composite of the present invention is about 5 to 100 nm in particle size.

13 Claims, 11 Drawing Sheets

FIG. 1 monoethanolamine (MEA)
*Mw*=61 diethanolamine (DEA)
*Mw*=105 triethanolamine (TEA)
*Mw*=137

(±)-1-Amino-2-propanol (MPA)
*Mw*=75 diglycolamine (DGA)
*Mw*=105

$N^1,N^1$-dimethyl-1,3-propanediamine (DAP)
*Mw*=116

JEFFAMINER Secondary Amines
(SD Series, ST Series)

| JEFFAMINE | | Base Product | MW |
|---|---|---|---|
| SD-231 | (XTJ-584) | D-230 | 315 |
| SD-401 | (XTJ-585) | D-400 | 515 |
| SD-2001 | (XTJ-576) | D-2000 | 2050 |
| SD-404 | (XTJ-586) | T-403 | 565 |

JEFFAMINE TRIAMINES (T Series)

| JEFFAMINE | R | n | Moles PO (x+z+z) | MW |
|---|---|---|---|---|
| T-403 | C$_2$H$_5$ | 1 | 5-6 | 440 |
| T-3000 (XTJ-509) | H | 0 | 50 | 3000 |
| T-5000 | H | 0 | 85 | 5000 |

FIG. 3C

Diglycidyl ether of bisphenol A (BE188)
App. $M_W = 350$

Poly(ethylene glycol) diglycidyl ether
App. $M_W = 526$

Poly(propylene glycol) diglycidyl ether
App. $M_W = 640$

OIL-DISPERSIBLE COMPOSITE OF METALLIC NANOPARTICLE AND METHOD FOR SYNTHESIZING SAME

BACKGROUND OF THE INVENTION

1. Field of the Invention

The present invention relates to an oil-dispersible composite of metallic nanoparticles and a method for synthesizing the same. Particularly, the oil-dispersible composite includes an oily polymeric polymer capable of chelating the metal. The oil-dispersible composite at high concentrations can be made into a film suitable for applications in electronics, sensors, antibacterial materials, nano-composites and polymers.

2. Related Prior Arts

Water is generally the solvent for producing silver nanoparticles (AgNPs). However, silver nanoparticles always gather with each other due to van der Waals' forces and it's hard for them to be dispersed in oily solvents or made in the form of powders. Therefore, it's very important to make silver nanoparticles more compatible with oily solvents in addition to controlling the particle size and stability.

To control particle sizes of the silver nanoparticles in chemical reduction processes, their thermal stability and compatible solvent phases should be considered. Therefore, organic surfactants or stabilizers are usually added to stabilize the silver nanoparticles in accordance with their electrostatic repulse or steric hindrance.

The known stabilizers include sodium polyacrylate, polyacrylamide (see J. Phys. Chem. B 1998, 102, 10663-10666), thioalkylated poly(ethylene glycol) (see Chem. Mater. 2005, 17, 4630-4635), 3-aminopropyltrimethoxysilane (APS) (see Langmuir 1999, 15, 948-951) and sodium citrate (see J. Phys. Chem. B 1999, 103, 9533-9539). The known surfactants include cationic surfactants such as cetyltrimethylammonium bromide-CTAB, anionic surfactants such as sodium dodecyl sulfate-SDS and nonionic surfactants such as ethoxylated (see Langmuir 1996, 12, 3585-3589) and poly(oxyethylene) isooctylphenyl ether-TX-100 (see Langmuir 1997, 13, 1481-1485).

To form silver paste, the solid content is required to be over 10 wt %. However, the above methods can proceed only in water phase and self-aggregation of the silver particles occurs at high solid contents. To prevent the reduced particles from aggregating, the concentrations of the silver ions must be lowered to ppm ranges during the reduction process. Moreover, the above methods require high cost because of complex processes and lengthy operations.

Therefore, the present invention provides an efficient method compatible with various solvent phases and capable of producing oil-dispersible silver nanoparticles.

SUMMARY OF THE INVENTION

The object of the present invention is to provide an oil-dispersible composite of metallic nanoparticles, so that the metal (particularly silver) nanoparticles not only have a proper size and good stability but also are dispersible in oily organic solvents at high concentrations.

Another object of the present invention is to provide a method for producing an oil-dispersible composite of metallic nanoparticles, which can be operated in moderate conditions and with metal ions of high concentrations.

The oil-dispersible composite of metallic nanoparticles of the present invention primarily includes metallic nanoparticles and an oily polymeric polymer. The oily polymeric polymer serves as carriers of the metallic nanoparticles to uniformly disperse the nanoparticles. The oil-dispersible composite have a size of about 5 to 100 nm, and preferably 5 to 33 nm. The metal can be Au, Ag, Cu or Fe. The oily polymeric polymer has a functional group capable of chelating the metal and has a molecular weight ranging from 2,000 to 200,000 g/mol.

The weight ratio of the above oily polymeric polymer to the metallic nanoparticles preferably ranges from 1:1 to 100:1. The oily polymeric polymer is preferably polyurethane (PU), which more preferably includes a poly(oxyalkylene) segment (—($CH_2CH_2O$)$_x$— or polyethylene glycol (PEG)) and a hydroxyl group (—OH) so as to chelate the metal ions and serve as a dispersant. For example, polyurethane (PU) has a structural formula as follows:

x = 44~45,

The metal is preferably Ag and a preferred composite is AgNP/PU.

In the present invention, the oil-dispersible metallic nanoparticles can be in the form of a solution or a film. Preferably, the metallic nanoparticles are present in an amount of 20 to 50 wt % in the film.

In the present invention, the method for producing the oil-dispersible composite of metallic nanoparticles primarily includes steps of: (a) reacting an oily polymeric polymer with metal ions in a solvent at 15 to 35° C. for 0.5 to 3 hours; wherein the metal is Au, Ag, Cu or Fe; and the oily polymeric polymer has a functional group capable of chelating the metal and a molecular weight ranging from 2,000 to 200,000 g/mol; (b) adding an organic reducing agent into the above solution to reduce the metal ions into metal atoms at 10 to 80° C. and form an oil-dispersible composite having a particle size 5 to 100 nm (even 5 to 33 nm); wherein the reducing agent is ethanolamine, poly(oxyalkylene)-amine or a polymer of ethanolamine, poly(oxyalkylene)-amine and epoxy.

In the above step (a), the weight ratio of the oily polymeric polymer to the metal preferably ranges from 1:1 to 100:1; the oily polymeric polymer is preferably polyurethane (PU); and the metal is preferably silver.

In the above step (b), the organic reducing agent can be ethanolamine having a general formula ($HOCH_2CH_2$)$_{3-z}$N(R)$_z$, wherein z=0, 1 or 2, R=H, alkyl or alkenyl having 1 to 18 carbon atoms. The organic reducing agent is preferably poly(oxyalkylene)-amine having a molecular weight of 400 to 6,000 g/mol, for example, poly(oxyethylene) amine, poly(oxypropylene) amine or poly(oxyethylene-oxypropylene) amine. Poly(oxyalkylene)-amine can be poly(oxyalkylene)-monoamine, poly(oxyalkylene)-diamine or poly(oxyalkylene)-triamine. In addition, the organic reducing agent can be a polymer of ethanolamine, poly(oxyalkylene)-amine and epoxy, wherein poly(oxyalkylene)-amine preferably has two amino groups to respectively bonding with ethanolamine and epoxy. Epoxy can be diglycidyl ether of bisphenol-A (DGEBA), 3,4-epoxycyclohexyl-methyl-3,4-epoxycyclohexane carboxylate, poly (ethylene glycol) diglycidyl ether or poly (propylene glycol) diglycidyl ether.

In the above step (b), the molar ratio of the metal to the organic reducing agent preferably ranges from 1:1 to 100:1, and more preferably from 1:1 to 10:1. The temperature of reduction reaction is about 10 to 80° C., and the reaction time is about 1 to 30 hours. The preferred operating conditions are: (i) ethanolamine as the reducing agent, reacting at 20 to 65° C. for 2 to 5 hours; (ii) poly(oxyalkylene)-amine as the reducing agent, reacting at 15 to 35° C. for 20 to 30 hours; or (iii) a polymer of ethanolamine, poly(oxyalkylene)-amine and epoxy as the reducing agent, reacting at 20 to 80° C. for 3 to 5 hours.

The method of the present invention can further include a step: (c) drying the oil-dispersible composite of metallic nanoparticles of step (b) so that the metallic nanoparticles are present in a concentration of 20 to 50 wt %.

ATTACHMENTS

ATTACHMENT 1 shows the operating conditions of Examples and Comparative Examples.
ATTACHMENT 2 shows particle sizes of AgNP/PU of Examples 3.1 to 3.5.
ATTACHMENT 3 shows solubilities of AgNP/PU in different solvents.

DETAILED DESCRIPTION OF THE PREFERRED EMBODIMENTS

Figure 1:
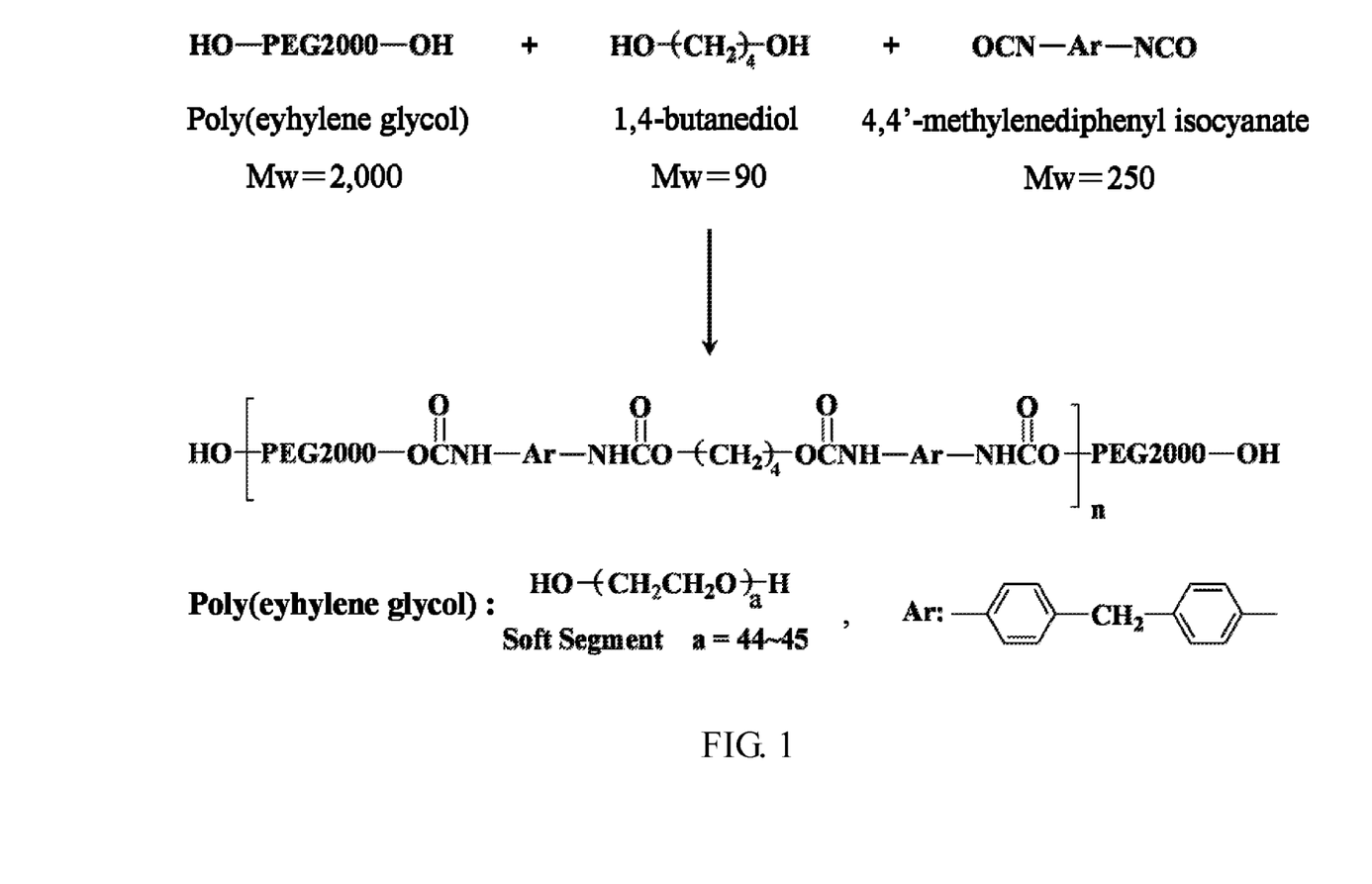
FIG. 1 shows the synthesis reaction and the structure of polyurethane (PU) suitable for the present invention.
Figure 2:
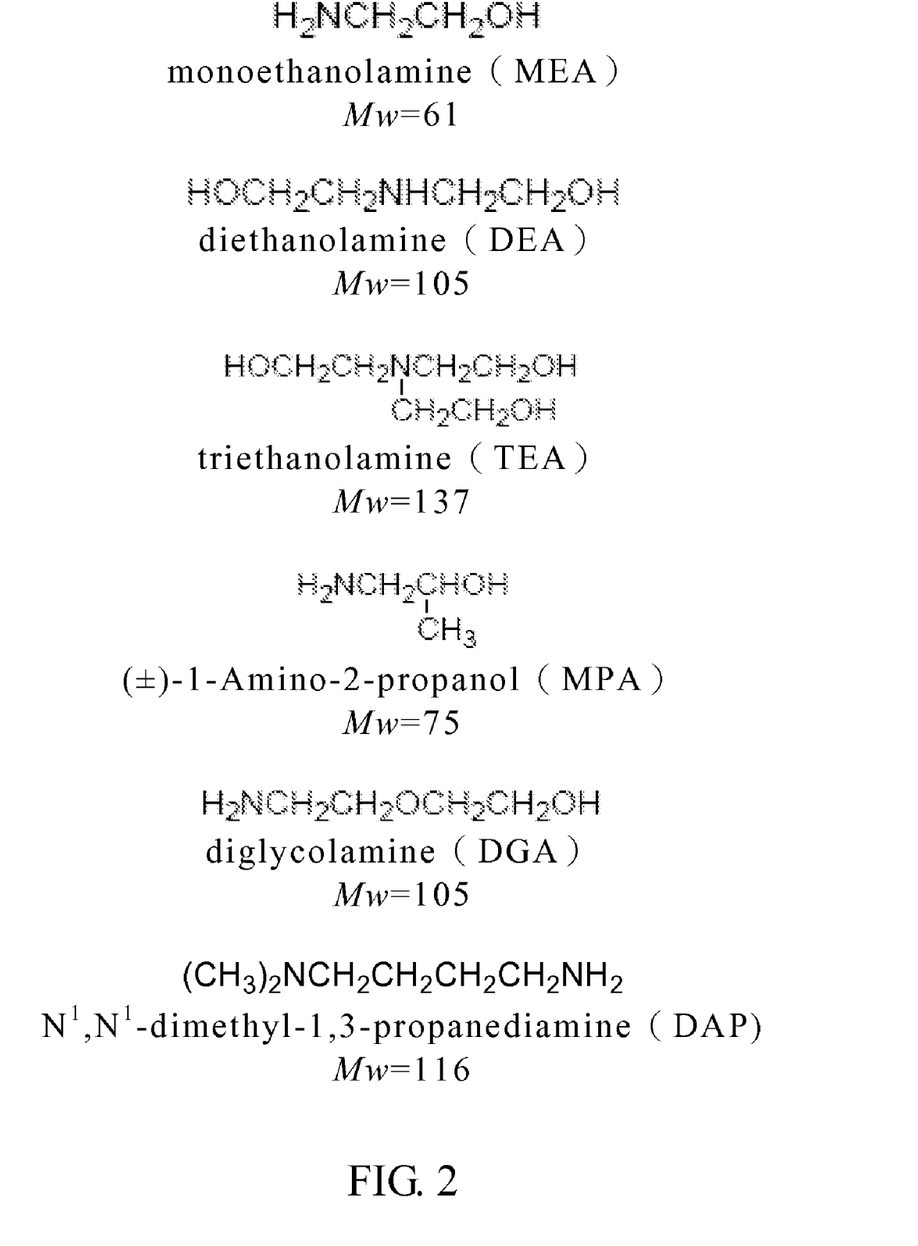
FIG. 2 shows examples of ethanolamine suitable for the present invention.
Figure 3A:
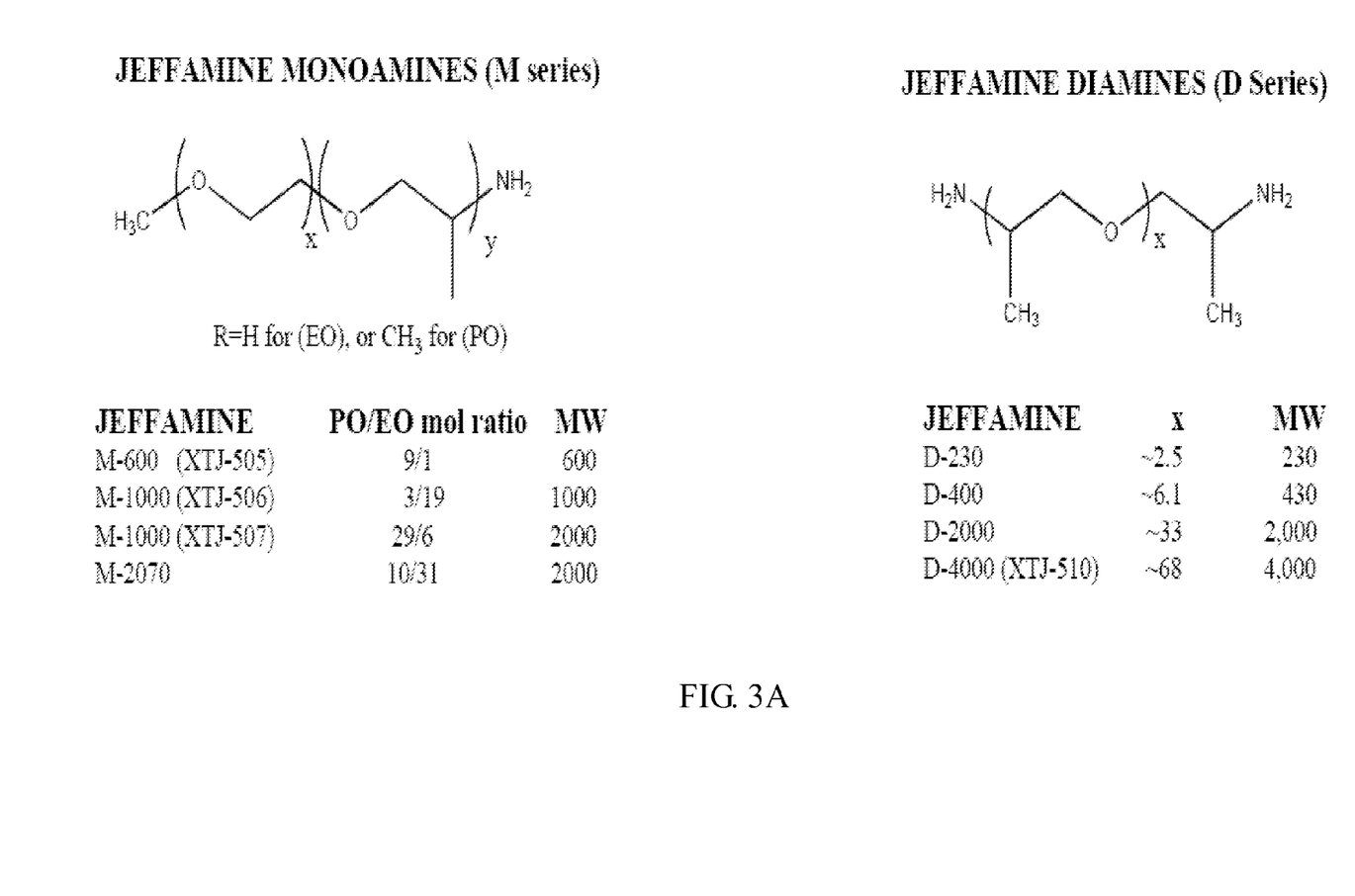
FIG. 3A shows examples of poly(oxyalkylene)-amine suitable for the present invention.
Figure 3B:
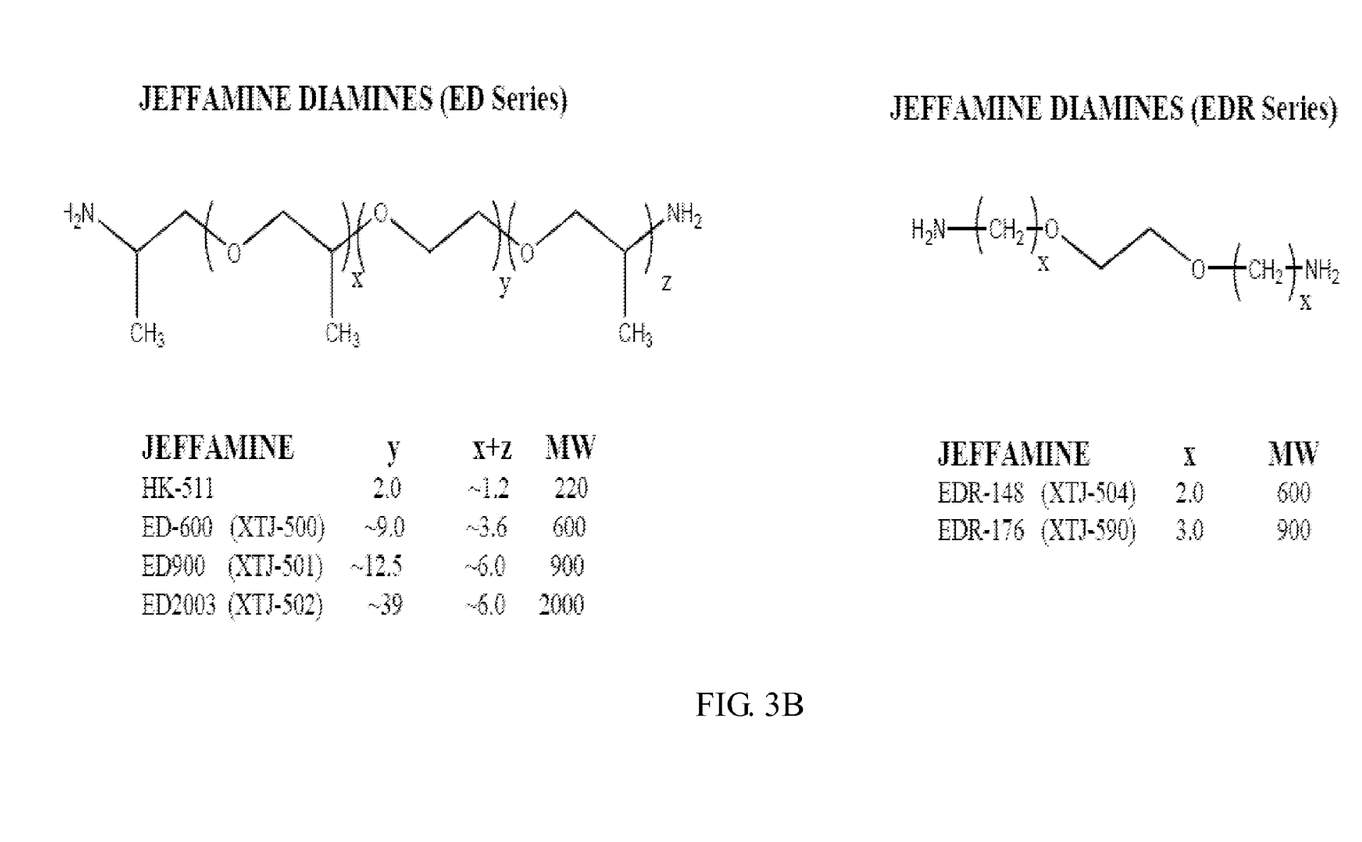
FIG. 3B shows examples of poly(oxyalkylene)-amine suitable for the present invention.
Figure 3C:
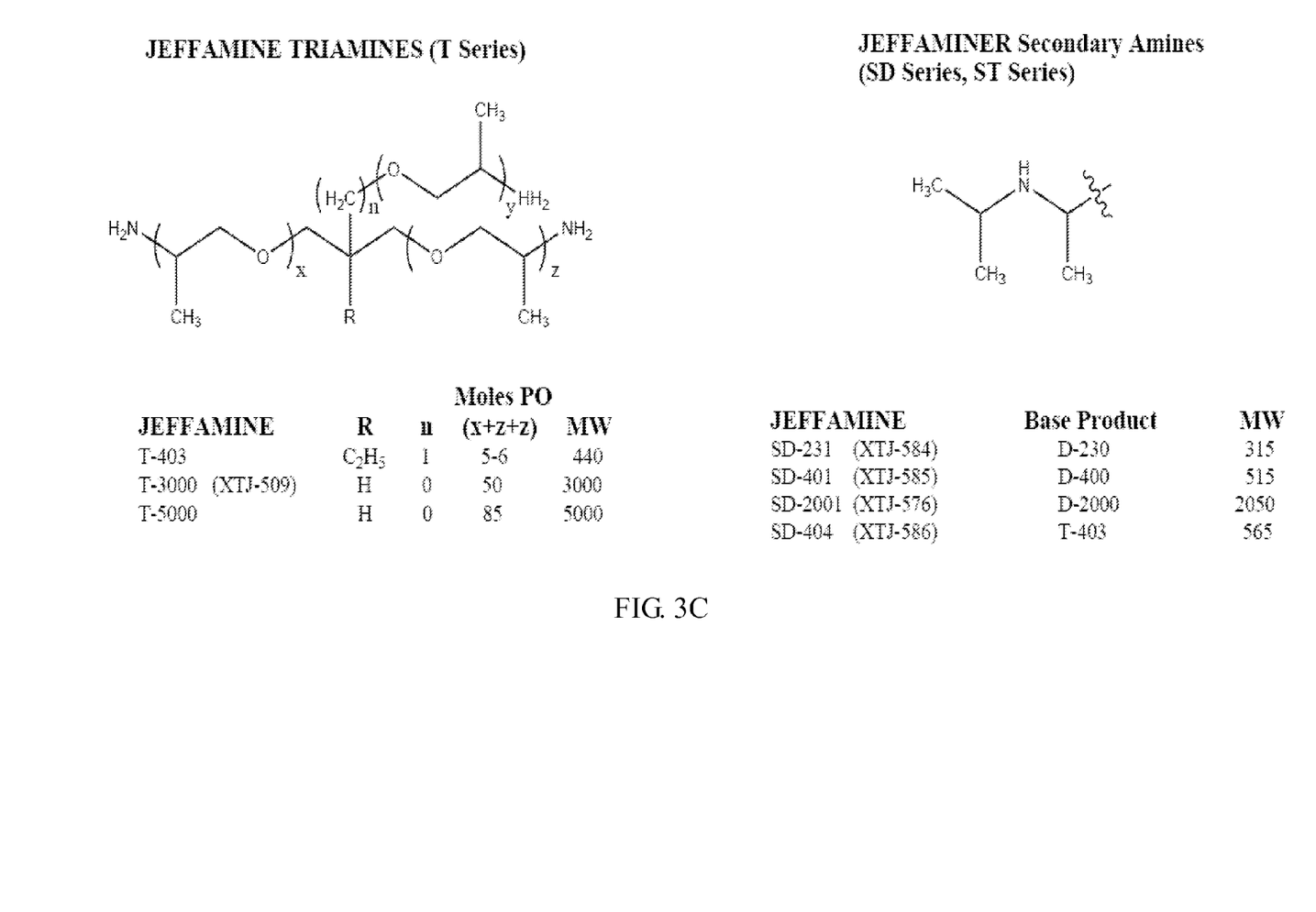
FIG. 3C shows examples of poly(oxyalkylene)-amine suitable for the present invention.
Figure 4:
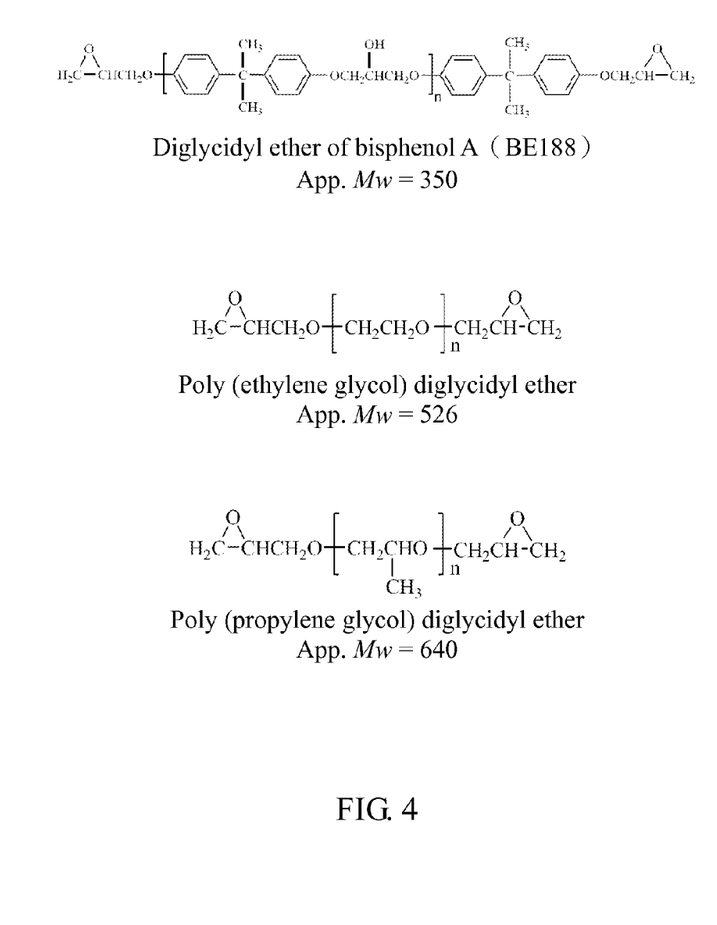
FIG. 4 shows examples of epoxy suitable for the present invention.

In the present invention, the materials used in Examples and Comparative Examples include
1. Polyurethane (PU): purchased from Kuo-Ching Chem. Co.; product name KC58238AU; FIG. 1 shows the synthesis reaction from polyethylene glycol (PEG), 1,4-butandiol and 4,4-methylenediphenyl isocyanate.
2. Silver nitrate: $AgNO_3$ (99.8 wt %), as the source of silver ions, purchased from Aldrich Co.; other silver salts such as AgI, AgBr, AgCl and silver pentafluoropropionate can also be used.
3. Reducing agents:
   (1) Ethanolamine: the general formula $(HOCH_2CH_2)_{3-x}N(R)_x$, x=0, 1 or 2; R=H or alkyl or alkenyl having 1 to 18 carbon atoms; for example, methyl, ethyl or cyclohexyl; FIG. 2 shows several examples. The preferred examples include diethanolamine (DEA), monoethanolamine (MEA), diglycolamine (DGA) and (±)-1-Amino-2-propanol (MPA).
   (2) Poly(oxyalkylene)-amine: including monoamine, diamine and tramine, having POE (poly(oxyethylene)) or POE (poly(oxypropylene)) segments, serving as monomers for reducing silver ions. FIG. 3 shows the examples. Those used in Examples are purchased from Huntsman, product names ED-2003, D-2000, M-2070, T-403 and T-5000.
   (3) Epoxy: capable of reacting with ethanolamine and poly(oxyalkylene)-amine to generate an oily polymeric polymer, FIG. 4 shows the diglycidyl ether derivatives of epoxy. In Examples diglycidyl ether of bisphenol A (BE188) is used.

The detailed steps are described as follows and the operating conditions are shown in ATTACHMENT 1:

Example 1.1

Step (a) Chelating Silver Ions by PU

To a three-necked bottle containing dimethyl fumarate (DMF, 10 g), PU (30 wt %, 10 g) was added and diluted to 15 wt % with mechanical mixing. Then $AgNO_3$ (1.18 g, including 0.75 g of Ag) was added such that the weight ratio of PU:Ag was 4:1. After being mixed at room temperature for 1 hour, the silver nitrate was disolved completely and the solution turned from semi-opaque to light yellow. With UV spectrum analysis, absorbance of silver was observed which indicated silver nanoparticles were generated.

Step (b) Reducing Silver Ions into Silver Nanoparticles

Figure 5:
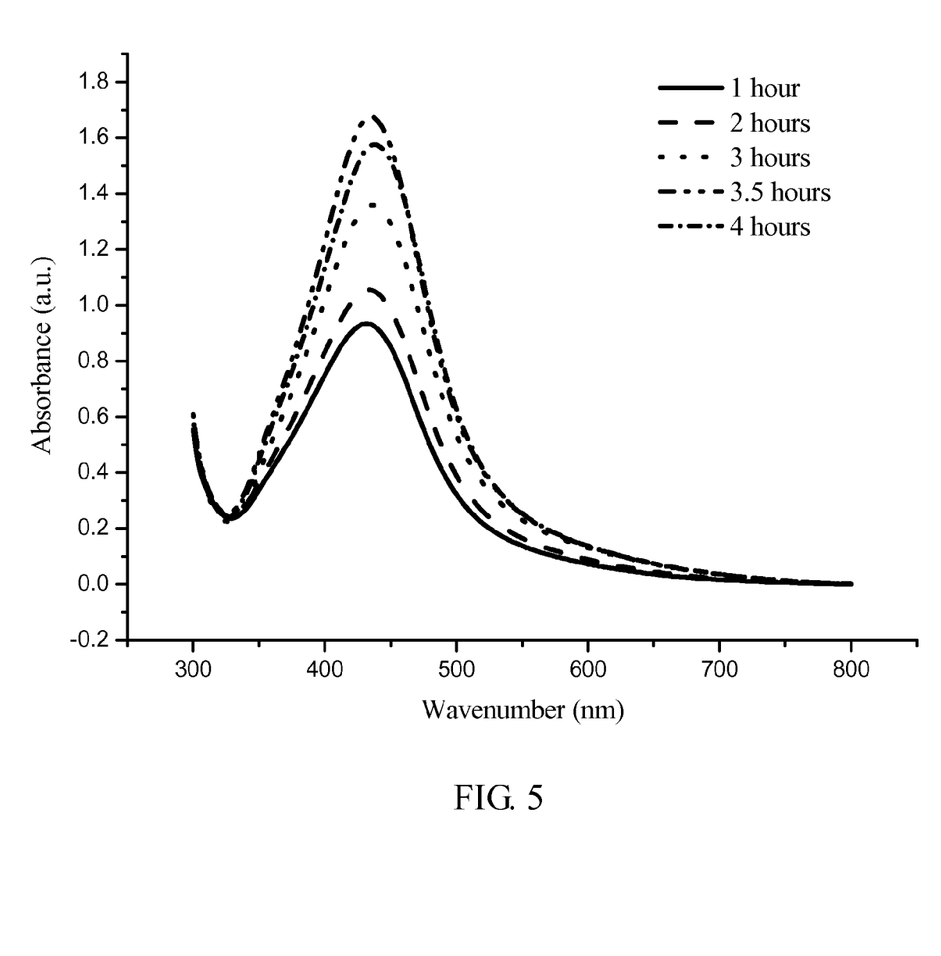
FIG. 5 shows UV absorbance of AgNP/PU obtained at different reaction times and using DEA as the reducing agent.

Then, DEA (0.109 g) was added and the molar ratio of $AgNO_3$:DEA was 1:0.15. After reacting at 55° C. for 3.5 hours, the solution turned from light yellow into deep black. FIG. 5 showed UV absorbance of AgNP/PU with reaction time. The data indicated that the absorbance at 436 nm hardly increased after 3.5 hours and the peak shifted to 439 nm at the 4th hour and the absorbance gradually decreased. The reason was that self-aggregation of the silver particles occurred.

Examples 1.2 to 1.4

Steps of Example 1.1 were repeated, except that DEA of step (b) was replaced with MEA, DGA and MPA, and the molar ratio of $AgNO_3$:ethanolamine was kept at 1:0.15. As a result, high-concentration and thermally-stable silver nanoparticles were generated.

Examples 2.1 to 2.3

Steps of Examples 1.2 to 1.4 were repeated, except that the reduction temperature of step (b) was changed to room temperature, and the weight ratio of PU:Ag was changed to 1.5:1. As a result, high-concentration silver nanoparticles were generated.

Examples 3.1 to 3.5

Figure 6:
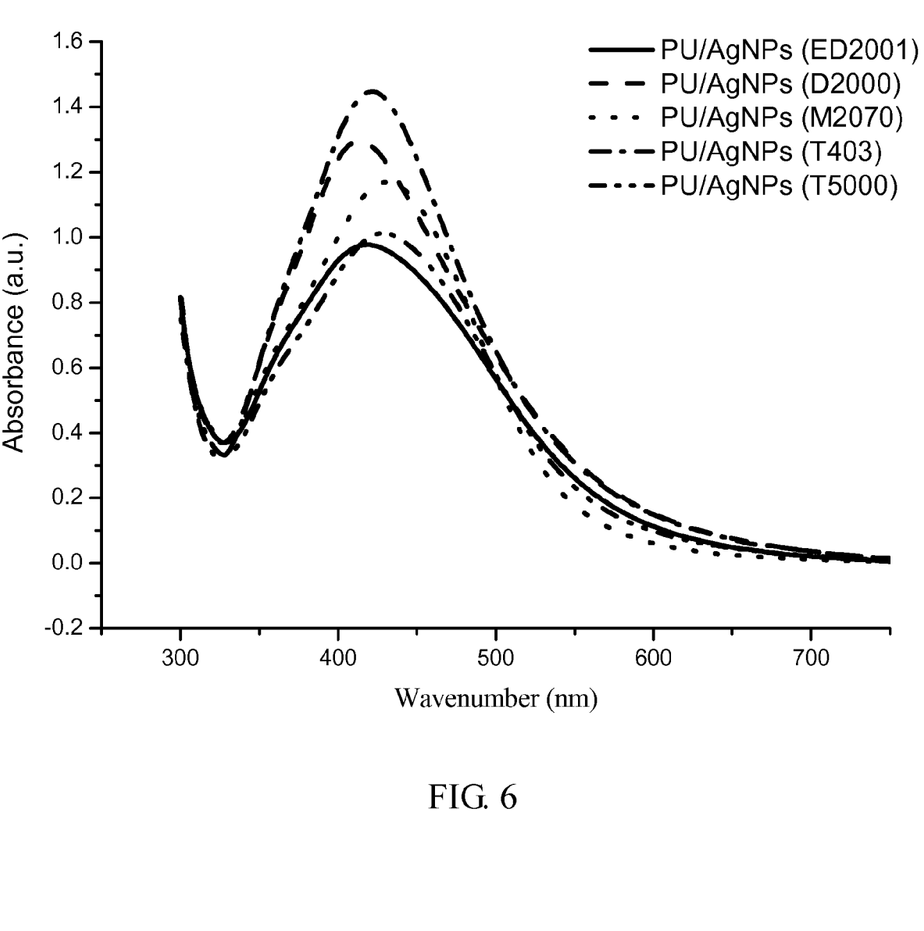
FIG. 6 shows UV absorbance of AgNP/PU obtained using different poly(oxyalkylene)-amines as the reducing agents.

Steps of Example 1.1 were repeated, except that the reducing agent of step (b) was replaced with poly(oxyalkylene)- amine (Jeffamine® ED-2003, D-2000, M-2070, T-403 and T-5000, respectively), and the weight ratio of PU:AgNO$_3$: poly(oxyalkylene)-amine was 4:1:1. After reacting at room temperature for 24 hours, black silver nanoparticles were obtained. The solution was then diluted to 500 ppm and became transparent brown. FIG. 6 showed the UV absorbance of AgNP/PU. ATTACHMENT 2 showed particle sizes of AgNP/PU of Examples 3.1 to 3.5. The results indicated that the commercialized hydrophobic or hydrophilic poly(oxyalkylene)-amine could be used to reduce silver ions into silver nanoparticles.

Examples 4.1 to 4.5

Synthesizing EEM

A Polymer of Ethanolamine, Poly(Oxyalkylene)-Amine and Epoxy

Figure 7:
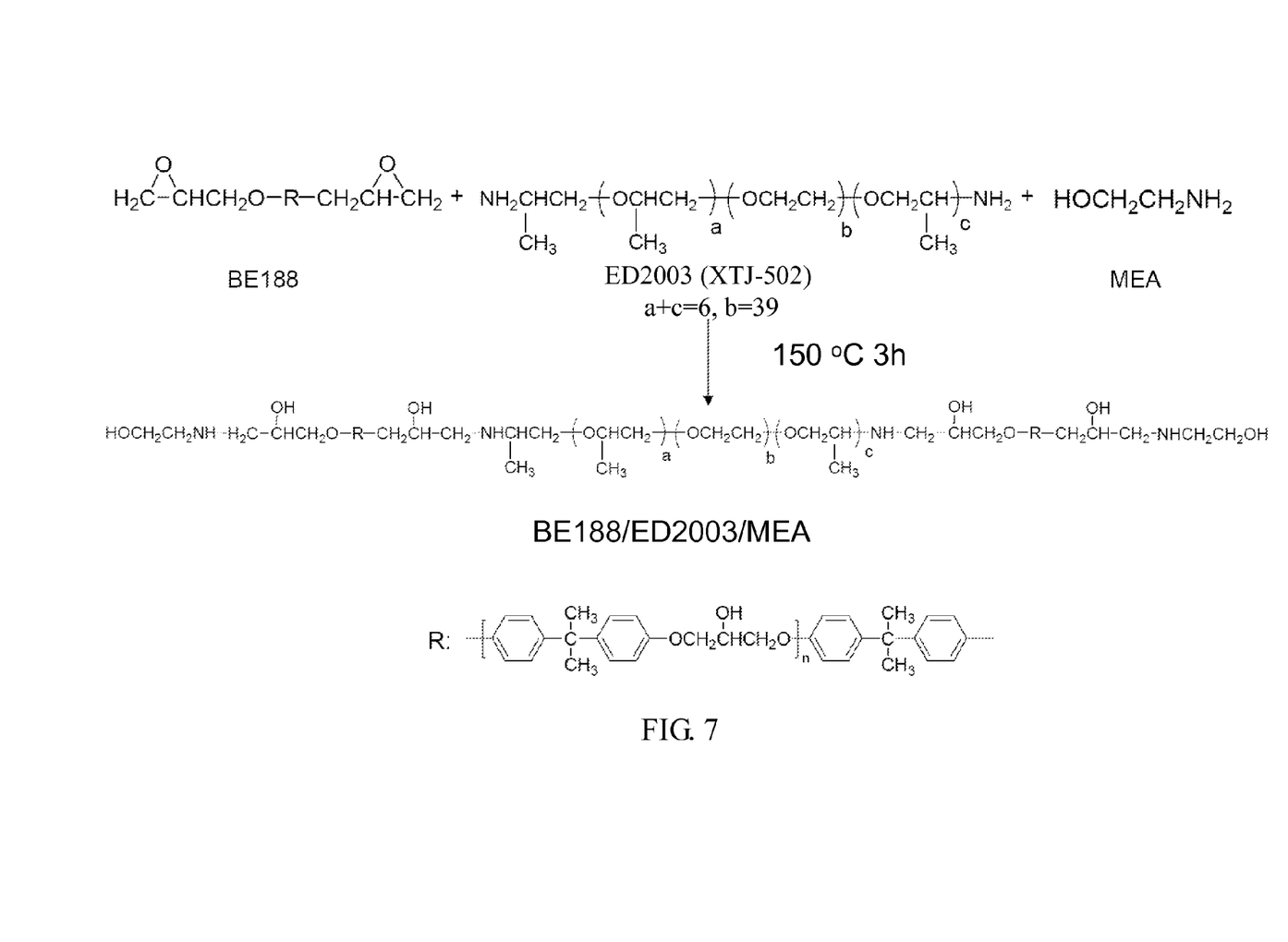
FIG. 7 shows the synthesis reaction of BE188/ED2003/MEA (EEM).

ED2003 was dewatered in vacuum at 120° C. for 6 hours. To a 500 ml three-necked bottle, BE188 (7 g, 0.02 mol), ED2003 (40 g, 0.02 mol) and MEA (1.22 g, 0.02 mol) were added and the molar ratio of BE188/ED2003/MEA was 1/1/1. The solution was mechanically mixed and the reaction proceeded in nitrogen at 120° C. for at least 5 hours. FIG. 7 showed the synthesis reaction. The reaction was monitored with IR spectrum and the solution was sampled every certain period till the feature peak of epoxy functional group did not appear. After complete reaction, light yellow stick product, the oily polymeric polymer BE188/ED2003/MEA (abbreviated as EEM), was achieved for the following reduction reaction.

Step (a) Chelating Silver Ions by PU

DMF (10 g) was added into PU (30 wt %, 10 g) and diluted to 15 wt % and then placed in a three-necked bottle for mechanically mixing. Then AgNO$_3$ (1.18 g) was added and the weight ratio of PU:Ag was 4:1. The solution was mixed at room temperature for 1 hour and the silver nitrate was dissolved completely. The solution became light yellow from semiopaque. Four more solutions the same as the above were prepared.

Step (b) Reducing Silver Ions into Silver Nanoparticles

To the above five solutions, EEM of different amounts (0.3 g, 0.2 g, 0.06 g, 0.03 g, 0.006 g) were respectively added and the solutions became red brown at room temperature. After reacting for 1 hour, the solutions were heated to 60° C. After reacting for 3 hours, the solutions became deep black from red brown. The products were diluted to 500 ppm with DMF and red brown to golden solutions were achieved.

Comparative Example 1

Procedures of Example 1.1 were repeated, except that no organic reducing agent was added. Finally, though stable silver ions were obtained, only a small part thereof could be reduced into silver nanoparticles. That is, the reducing agents of the present invention were necessary.

Comparative Example 2

Procedures of Example 1.1 were repeated, except that the reducing agent was replaced with a water-soluble salt, NaBH$_4$. The solution looked like a gel. After several hours, the gel became black and was not dispersible. That is, the reducing agents of the present invention were necessary.

Figure 8:
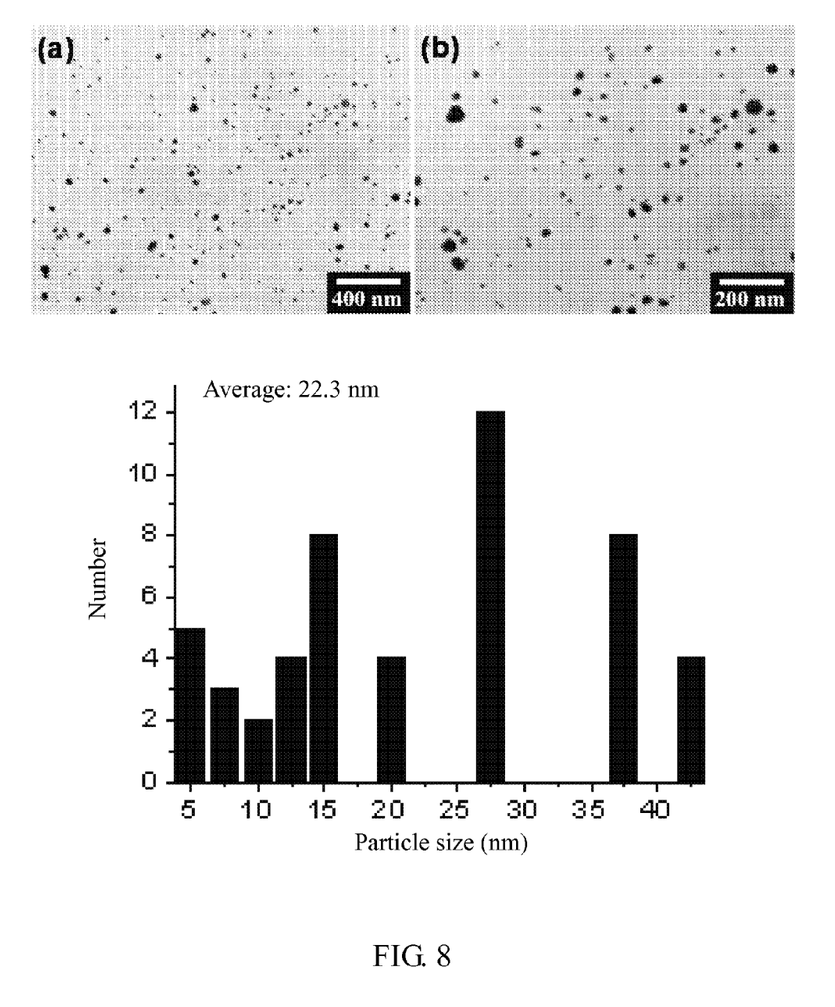
FIG. 8 shows the particle sizes of silver in AgNP/PU observed with TEM (transmission electron microscopy).
Figure 9:
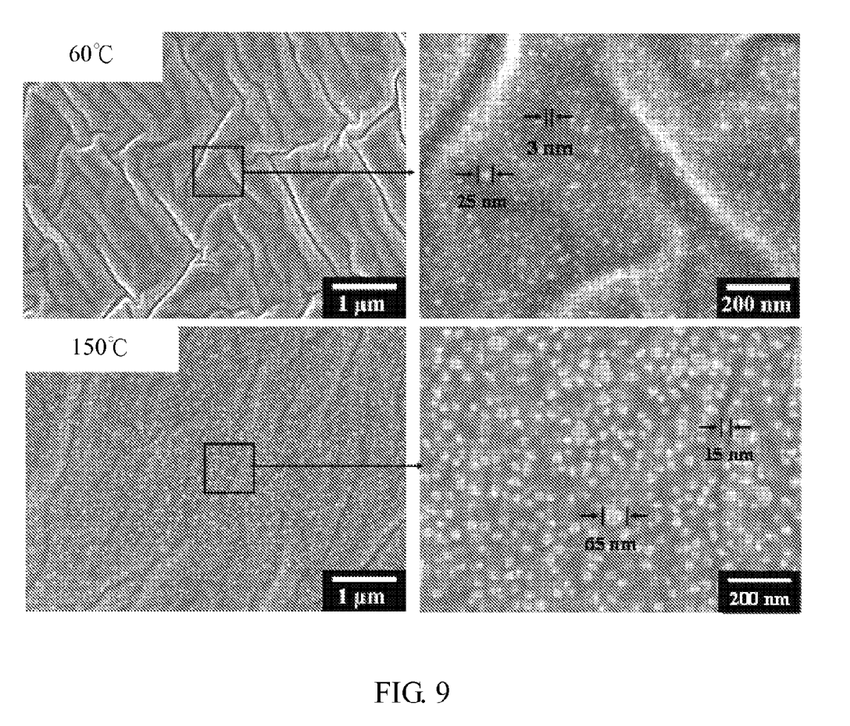
FIG. 9 shows the silver distributed in AgNP/PU films formed at different temperatures and observed with SEM.

The AgNP/PU achieved in Example 1.1 could be further treated as follows:

1. The AgNP/PU was diluted with DMF to 35 ppm to form a golden solution of AgNP/PU. The particle sizes of AgNP were observed with TEM, ranging from 5 to 43 nm, as shown in FIG. 8. Other solvents such as dimethyl fumarate (DMF), N-methyl-2-pyrrolidone (NMP) or dimethyl sulfoxide (DMSO) or a co-solvent including one of the three solvents (NMP, DMF, DMSO) could be used to dilute the AgNP/PU. ATTACHMENT 3 showed solubilities of the AgNP/PU in solvents.
2. The above golden solution of AgNP/PU was dried at 60° C. for 1 hour and a thin film of AgNP/PU was achieved. FIG. 9 showed the silver distributed in AgNP/PU films formed at different temperatures and observed with SEM. The particle sizes were about 5 to 25 nm. Similarly, AgNP/PU of Example 4.3 to 4.5 could be formed as thin films.
3. For the film of AgNP/PU dried at 150° C., the particle sizes were about 15 to 65 nm, as shown in FIG. 9. The reason might be migration of silver nanoparticles to the surface during heating.
4. The above films of AgNP/PU could be dissolved in DMF, NMP or co-solvents of ATTACHMENT 3 again. The silver nanoparticles can still be present in high concentrations and have good thermal stability.

From the above Examples and Comparative Examples, the following conclusions could be drawn:

1. The oily polymeric polymer (PU) used to produce AgNP/PU dispersion facilitates stability, film-forming and controlling particle size of the silver nanoparticles.
2. By controlling the weight ratio of the oily polymeric polymer to silver particles, the particle sizes of AgNP/PU composite are uniformly distributed at a nano scale, usually smaller than 100 nm, and even less than 10 nm.
3. Compared to traditional silver dispersions having an upper limit at about 5 wt % and disadvantages of precipitation and self-aggregation, the present invention provides a AgNP/PU dispersion with high concentrations and uniformity.
4. The AgNP/PU dispersion of the present invention can form thin films after being dried; and the films can be stably dispersed in several solvents again.
5. The AgNP/PU of the present invention is hydrophobic so that the dispersing media can be organic solvent, for example, dimethyl fumarate (DMF), N-methyl-2-pyrrolidone (NMP) or dimethyl sulfoxide (DMSO), or co-solvents of the above solvents and other organic solvents such as isopropyl alcohol (IPA), acetone, methyl ethyl ketone (MEK) and toluene.
6. The AgNP/PU of the present invention has good electrical conductivity or antibacterial property and thus is suitable for applications with organic polymers to form nano composite; for example, polyimide (PI), epoxy, nylon, polypropylene (PP), acrylonitrile butadiene styrene (ABS), polystyrene (PS), etc.
7. By the method of the present invention, the composite of silver nanoparticles can be produced without any surfactant and is dispersible in oily solvents and compatible with many kinds of polymers.
8. Compared to the traditional processes, the method of the present invention is conducted under more moderate conditions and therefore needs a lower cost.

ATTACHMETN 1

| Example/Comparative Example | AgNO₃ (g) | PU/Ag (w/w) | Reducing agent | Reducing agent (g) | Ag/Reducing agent | Reduction temp. ( ) | Reduction time (h) |
|---|---|---|---|---|---|---|---|
| Example 1.1 | 1.18 | 4/1 | DEA | | 1/0.15 (mol/mol) | 55 | 3.5 |
| Example 1.2 | 1.18 | 4/1 | MEA | | 1/0.15 (mol/mol) | 55 | 3.5 |
| Example 1.3 | 1.18 | 4/1 | DGA | | 1/0.15 (mol/mol) | 55 | 3.5 |
| Example 1.4 | 1.18 | 4/1 | MPA | | 1/0.15 (mol/mol) | 55 | 3.5 |
| Example 2.1 | 1.18 | 1.5/1 | MEA | | 1/0.15 (mol/mol) | RT | 3.5 |
| Example 2.2 | 1.18 | 1.5/1 | DGA | | 1/0.15 (mol/mol) | RT | 3.5 |
| Example 2.3 | 1.18 | 1.5/1 | MPA | | 1/0.15 (mol/mol) | RT | 3.5 |
| Example 3.1 | 1.18 | 4/1 | ED-2003 | | 1/1 (w/w) | RT | 24 |
| Example 3.2 | 1.18 | 4/1 | D-2000 | | 1/1 (w/w) | RT | 24 |
| Example 3.3 | 1.18 | 4/1 | M-2070 | | 1/1 (w/w) | RT | 24 |
| Example 3.4 | 1.18 | 4/1 | T-403 | | 1/1 (w/w) | RT | 24 |
| Example 3.5 | 1.18 | 4/1 | T-5000 | | 1/1 (w/w) | RT | 24 |
| Example 4.1 | 1.18 | 4/1 | EEM | 0.3 | 1/0.4 (w/w) | RT (Room temperature) for 1 h, and 60 for 3 h | |
| Example 4.2 | 1.18 | 4/1 | EEM | 0.2 | 1/0.26 (w/w) | | |
| Example 4.3 | 1.18 | 4/1 | EEM | 0.06 | 1/0.08 (w/w) | | |
| Example 4.4 | 1.18 | 4/1 | EEM | 0.03 | 1/0.04 (w/w) | | |
| Example 4.5 | 1.18 | 4/1 | EEM | 0.006 | 1/0.008 (w/w) | | |
| Comparative Example 1 | — | | — | | — | 55 | 3.5 |
| Comparative Example 2 | | | NaBH₄ | | 1/0.15 | 55 | 3.5 |

EEM/BE188/ED2001/MEA

ATTACHMETN 2

| Example | Reducing agent | Average diameter (nm) |
|---|---|---|
| 3.1 | ED-2003 | 4.4 |
| 3.2 | D-2000 | 3.7 |
| 3.3 | M-2070 | 4.7 |
| 3.4 | T-403 | 9.5 |
| 3.5 | T-5000 | 29.2 |

ATTACHMETN 3

| B \ A | water | ethanol | acetone | Toluene | IPA | PGMEA | NMP | DMF | DMSO |
|---|---|---|---|---|---|---|---|---|---|
| | x | x | x | x | x | x | ○ | ○ | ○ |
| NMP | ○[b] | ○[b] | ○[a] | ○[a] | ○[a] | ○[a] | ○[a] | ○[a] | ○[a] |
| DMF | ○[b] | ○[b] | ○[a] | ○[a] | ○[a] | ○[a] | ○[a] | ○[a] | ○[a] |

[a] A/B = 1/1 (w/w)
[b] A/B = 10/1 (w/w)
IPA: isopropyl alcohol
PGMEA: Propylene glycol monomethylether acetate
NMP: N-methyl-2-pyrrolidinone
DMF: Dimethylformamide
DMSO: Dimethyl sulfoxide
○: good solubility
x: not good solubility

What is claimed is:

1. An oil-dispersible composite of metallic nanoparticles, the composite having a particle size of about 5 to 100 nm and comprising metallic nanoparticles (or metal particles of a nano size) and polyurethane (PU); wherein
the polyurethane (PU) chelates the metallic nanoparticles and serves as carriers for the metallic nanoparticles so that the metallic nanoparticles are uniformly dispersed;
the metal is Au, Ag, Cu or Fe; and
the polyurethane (PU) has a poly(oxyalkylene) segment and a hydroxyl group, capable of chelating the metal and has a molecular weight ranging from 2,000 to 200,000 g/mol.

2. The oil-dispersible composite of metallic nanoparticles of claim 1, wherein the weight ratio of the polyurethane (PU) to the metallic nanoparticles ranges form 1:1 to 100:1.

3. The oil-dispersible composite of metallic nanoparticles of claim 1, wherein the metal is Ag.

4. The oil-dispersible composite of metallic nanoparticles of claim 1, wherein the metallic nanoparticles are present in an amount of 20 to 50 wt %.

5. A method for producing an oil-dispersible composite of metallic nanoparticles, comprising steps of:
(a) reacting polyurethane (PU) with metal ions in a solvent at 15 to 35° C. for 0.5 to 3 hours, wherein the metal is Au, Ag, Cu or Fe; and the polyurethane (PU) has a poly(oxyalkylene) segment and a hydroxyl group, capable of chelating the metal and a molecular weight ranging from 2,000 to 200,000 g/mol; and
(b) adding an organic reducing agent into the solution from (a) to reduce the metal ions into metal atoms at 10 to 80°

C. and form a composite having a particle size of 5 to 100 nm, wherein the reducing agent is ethanolamine, poly(oxyalkylene)-amine or a polymer of ethanolamine, poly(oxyalkylene)-amine and epoxy.

6. The method of claim 5, wherein the metal is silver and the weight ratio of the polyurethane (PU) to the silver ions in step (a) ranges from 1:1 to 100:1.

7. The method of claim 6, wherein the solvent is dimethyl fumarate (DMF), N-methyl-2-pyrrolidone (NMP) or dimethyl sulfoxide (DMSO).

8. The method of claim 6, wherein the molar ratio of the silver ions to the organic reducing agent in step (b) is 1:1 to 100:1.

9. The method of claim 6, wherein the molar ratio of the silver ions to the organic reducing agent in step (b) is 1:1 to 10:1.

10. The method of claim 6, wherein the organic reducing agent in step (b) is ethanolamine having a general formula $(HOCH_2CH_2)_{3-z}N(R)_z$, z=0, 1 or 2, R=H, alkyl or alkenyl having 1 to 18 carbon atoms.

11. The method of claim 6, wherein the organic reducing agent of step (b) is poly(oxyalkylene)-amine having a molecular weight of 400 to 6,000.

12. The method of claim 6, wherein the organic reducing agent of step (b) is a polymer of ethanolamine, poly(oxyalkylene)-amine and epoxy, wherein the epoxy is diglycidyl ether of bisphenol-A (DGEBA) or 3,4-epoxycyclohexyl-methyl-3,4-epoxycyclohexane carboxylate.

13. The method of claim 6, further comprising a step: (c) drying the oil-dispersible composite of metallic nanoparticles of step (b) so that the metallic nanoparticles are present in a concentration of 20 to 50 wt %.

* * * * *